United States Patent
Holborow (10) Patent No.: US 7,418,011 B2
(45) Date of Patent: Aug. 26, 2008

(54) METHOD AND SYSTEM FOR MULTIPLEXING DOCSIS DATA INTO AN MPEG TRANSPORT STREAM

(75) Inventor: Clive E. Holborow, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 751 days.

(21) Appl. No.: 10/775,907

(22) Filed: Feb. 10, 2004

(65) Prior Publication Data

US 2005/0175040 A1    Aug. 11, 2005

(51) Int. Cl.
*H04J 3/06* (2006.01)
(52) U.S. Cl. ....................... 370/503; 370/509
(58) Field of Classification Search ........... 370/503, 370/509–514; 725/86–104
See application file for complete search history.

(56) References Cited

U.S. PATENT DOCUMENTS

| | | | |
|---|---|---|---|
| 2001/0030959 A1* | 10/2001 | Ozawa et al. | 370/386 |
| 2002/0012343 A1* | 1/2002 | Holloway et al. | 370/389 |
| 2002/0061012 A1* | 5/2002 | Thi et al. | 370/352 |
| 2003/0053476 A1* | 3/2003 | Sorenson et al. | 370/431 |
| 2003/0058890 A1* | 3/2003 | Ritchie et al. | 370/486 |
| 2003/0079230 A1* | 4/2003 | Woodward et al. | 725/90 |
| 2003/0189571 A1* | 10/2003 | MacInnis et al. | 345/505 |
| 2003/0200548 A1* | 10/2003 | Baran et al. | 725/90 |

* cited by examiner

*Primary Examiner*—Kwang B. Yao
*Assistant Examiner*—Andrew Lai
(74) *Attorney, Agent, or Firm*—Benjamin D. Driscoll (57) ABSTRACT

A method for multiplexing DOCSIS data into an MPEG data stream includes synchronizing an MPEG system clock and a DOCSIS system clock, multiplexing a DOCSIS data stream into an MPEG Transport Stream while preserving the accuracy of a number of MPEG program clock reference (PCR) values, transmitting the multiplexed Transport Stream, receiving the multiplexed Transport Stream in a receiving device, recovering the MPEG PCR values, and generating a DOCSIS clock based on the MPEG PCR values.

29 Claims, 4 Drawing Sheets

METHOD AND SYSTEM FOR MULTIPLEXING DOCSIS DATA INTO AN MPEG TRANSPORT STREAM

FIELD

The present method and system relate to data transfer. More particularly, the present method and system provides for multiplexing data into an MPEG Transport Stream.

BACKGROUND

In its classic form, a cable television system carries information in only one direction, from the cable system headend to the individual user. The user's interface to the system generally includes a receiver, for example a television or a stereo. During operation, the head end transmits television or stereo channels simultaneously. In general, the user has no influence on what is transmitted and could only choose among the channels the headend was transmitting.

More recently, data communication between a cable headend unit and a subscribing set-top box has been used for a number of two-way communication functions including ordering pay-per-view programming. Additionally, cable television networks have become available for the transmission of data. A typical cable television system can carry many television stations, which are the equivalent of a large amount of data (high bandwidth), simultaneously. Because of the increasing availability of cable television infrastructure, using television cables as the medium for computer data networks has the potential for giving users high bandwidth at a reasonable cost. However, a cable network typically requires a number of enhancements such as a cable modem and a network protocol to assure that each user receives the information they require without interference from other users.

While the addition of a cable modem to each set-top box effectively facilitates two-way communication between a set-top box and a headend unit, the added cost of a cable modem to a set-top box is often prohibitive. Moreover, consumers already own a number of set-top boxes that are not equipped with cable modems.

SUMMARY

A method for multiplexing DOCSIS data into an MPEG data stream includes synchronizing an MPEG system clock and a DOCSIS system clock, multiplexing a DOCSIS data stream into an MPEG Transport Stream while preserving the accuracy of a number of MPEG program clock reference (PCR) values, transmitting the multiplexed Transport Stream, receiving the multiplexed Transport Stream in a receiving device, recovering the MPEG PCR values, and generating a DOCSIS clock based on the MPEG PCR values.

BRIEF DESCRIPTION OF THE DRAWINGS

The accompanying drawings illustrate various embodiments of the present method and system and are a part of the specification. Together with the following description, the drawings demonstrate and explain the principles of the present method and system. The illustrated embodiments are examples of the present method and system and do not limit the scope thereof.

Throughout the drawings, identical reference numbers designate similar but not necessarily identical elements.

DETAILED DESCRIPTION

The present specification describes a method and a system for multiplexing DOCSIS data into an MPEG Transport Stream. More specifically, the present method and system includes synchronizing the DOCSIS clock to the MPEG program clock reference (PCR) clock in the headend and transmitting only the MPEG PCR value in the multiplexed MPEG Transport Stream. Once the data and the PCR values are received by a receiver, the receiver recovers the PCR clock and generates a DOCSIS reference clock from the recovered MPEG PCR values.

In the present specification and in the appended claims, the term "packet" or "data packet" is meant to be understood broadly as any unit of data that is routed between an origin and a destination on any packet-switched network. A data packet may be divided into a number of frames prior to transmission. A "frame" or "frames" is meant to be understood broadly as data that is transmitted between network points as a unit complete with addressing and necessary protocol control information. A frame is typically transmitted serial bit by bit and contains a header field. However, some control frames contain no data.

Additionally, the term "downstream" is meant to be understood broadly as the sending of data packets or other information from a headend or other centralized location to a number of client devices. Similarly, the term "upstream" is meant to be understood broadly as the transmission of data packets or other information from a client device back to the headend or other centralized location. According to one exemplary embodiment, the bandwidth allocated to the transmission of data downstream is larger than the bandwidth of data transmitted upstream. More specifically, according to one exemplary embodiment, 6 MHz is allocated for the transmission of data or data packets downstream while only 3.2 MHz of bandwidth is allocated for the transmission of data or data packets upstream.

A "set-top box" is meant to be understood broadly as any device that enables a television set to become a user interface to the Internet or enables a television set to receive digital television (DTV) broadcasts. A "cable head-end" is a centralized facility or a system at a local cable TV office that originates and communicates cable TV services and/or cable modem services to subscribers.

In the following description, for purposes of explanation, numerous specific details are set forth in order to provide a thorough understanding of the present method and system for multiplexing DOCSIS data into an MPEG Transport Stream. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Overall Structure

Figure 1:
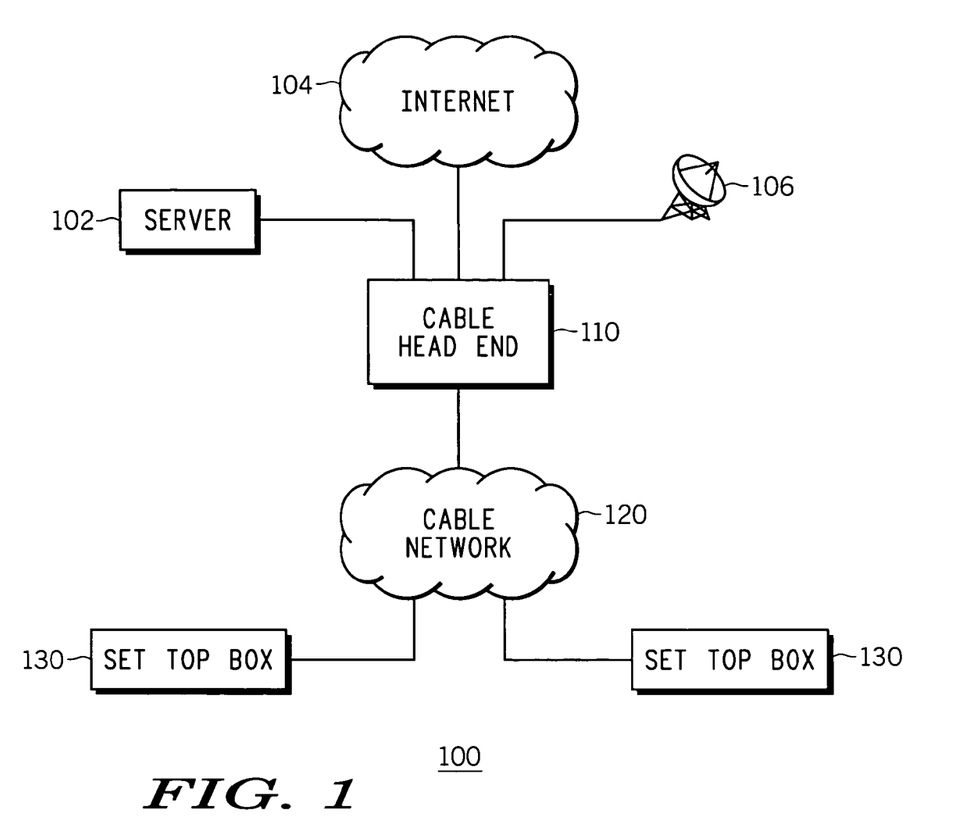
FIG. 1 is a simple block diagram illustrating a cable television network with a tree-and-branch architecture according to one exemplary embodiment.

FIG. 1 illustrates a cable television network with a tree-and-branch architecture according to one exemplary embodiment. As shown in FIG. 1, the cable television (CATV) network (100) includes a cable headend unit (110). As shown in FIG. 1, a number of data sources (102, 104, 106) may be communicatively coupled to the cable headend unit (110) including, but in no way limited to, a plurality of servers (102), the Internet (104), radio signals, or television signals received via a satellite connection (106). The cable headend (110) is also communicatively coupled to one or more set-top boxes (130) through a cable network (120).

As shown in FIG. 1, the cable headend (110) is coupled to a number of data sources (102, 104, 106). The cable headend (110) illustrated in the exemplary embodiment shown in FIG. 1 may be any centralized facility or a system at a local cable TV office that originates and communicates cable TV services and/or cable modem services to subscribers. The cable TV services and/or cable modem services may be received by the cable headend (110) from any number of sources including those listed above.

Figure 2:
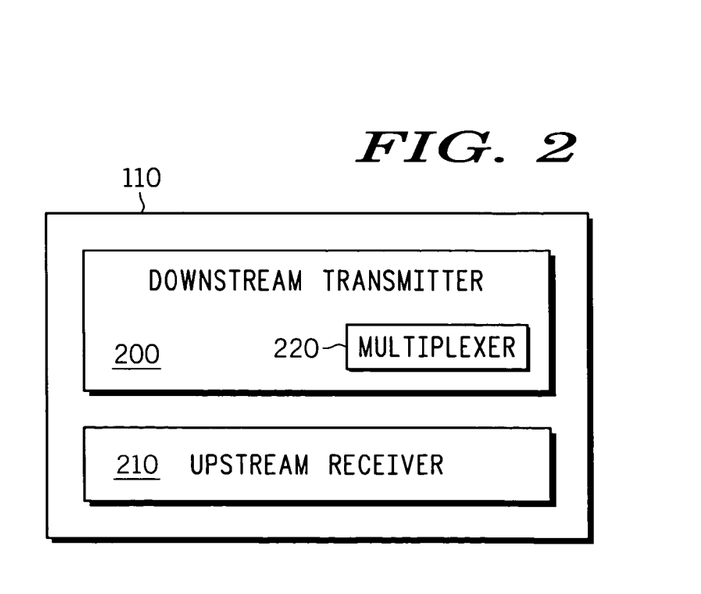
FIG. 2 is a simple block diagram illustrating a number of individual components in a cable headend unit according to one exemplary embodiment.

FIG. 2 further illustrates the internal components of the cable headend unit (110) illustrated in FIG. 1. As shown in FIG. 2, a cable headend unit (110) may include a downstream transmitter (200) including a multiplexer (220) and an upstream receiver (210). The downstream transmitter (200) illustrated in FIG. 2 is configured to receive incoming data, manipulate that data appropriately, and generate modulated radio frequency (RF) signals based on the manipulated data. The multiplexer (220), that may either form a part of the downstream transmitter (200) or be external and communicatively coupled to the downstream transmitter (200), is configured to combine a plurality of received signals in preparation for their transmission into the cable network (120; FIG. 1). In contrast, the upstream receiver (210) is configured to receive signals transmitted to the cable headend unit (110) from the set-top boxes (130; FIG. 1) via the cable network (120; FIG. 1).

The cable network (120) illustrated in FIG. 1 is the medium over which the RF signals produced by the cable headend unit (110) or by a set-top box (130) are transmitted. The cable network (120) may be any medium configured to transmit RF signals including, but in no way limited to, a coaxial cable.

Figure 3:
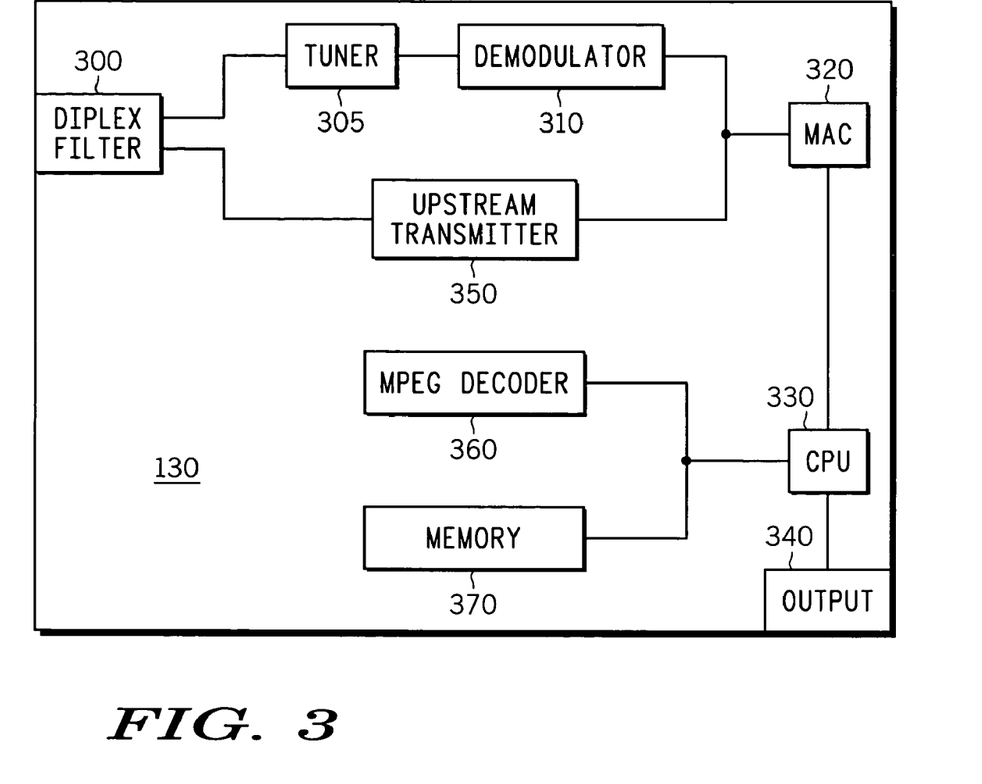
FIG. 3 is a simple block diagram illustrating a number of individual components of a set-top box according to one exemplary embodiment.

Once transmitted through the cable network, a downstream signal is received by a designated set-top box (130). FIG. 3 illustrates the internal components of a set-top box according to one exemplary embodiment. As shown in FIG. 3, the set-top box (130) includes a diplex filter (300), a tuner (305), a demodulator (310), an upstream transmitter (350), a media access control unit (MAC) (320), a CPU (330), an output port (340), an MPEG decoder (360) and a memory storage unit (370).

The diplex filter (300) is coupled to the RF input receiving data from the cable network (120; FIG. 1). The diplex filter (300) splits the cable RF spectrum into its upstream and downstream components. Consequently, the diplex filter (300) is coupled to the RF network input (not shown) on one side and includes two connections on the STB side, a downstream connection and an upstream connection. The downstream signal passes through the diplex filter (300) to the tuner (305) and the tuner output connects to the demodulator (310). The upstream transmitter (350) is coupled to the second (upstream) connection on the STB side of the on the diplex filter (300). According to one exemplary embodiment, the diplex filter is integrated into the tuner (305) assembly. The tuner (305) illustrated in FIG. 3 is communicatively coupled to the diplex filter (300) and receives the downstream signal. After the tuner (305) receives a downstream signal, it is passed to the demodulator (310).

The tuner (305) illustrated in FIG. 3 is communicatively coupled to the demodulator (310). The demodulator (310) illustrated in FIG. 3 performs a number of functions within the set-top box (130). According to one exemplary embodiment, the demodulator (310) is a quadrature amplitude modulation (QAM) demodulator configured to take a received RF signal and recover from it the transmitted digital signal.

The upstream transmitter (350) that is coupled to the diplex filter (300) is used to modulate upstream signals into radio-frequency signals for transmission. This component is sometimes called a burst modulator, because it transmits the upstream traffic in bursts of data rather than continuously. The upstream transmitter (350) may include, but is in no way limited to, a QAM modulator and a digital to analog (D/A) converter.

A MAC (320) is communicatively coupled to both the upstream transmitter (350) and the demodulator (310). The MAC (320) sits between the upstream and downstream portions of the set-top box (130), and acts as the interface between the hardware and software portions of the various network protocols. Additionally, some of the MAC (320) functions will be assigned to a central processing unit (CPU) (330). The CPU (330) picks up MAC slack and much more. Once processed by the CPU (330), a received signal may be transmitted to any number of external devices through the set-top box output (340).

The MPEG decoder (360) illustrated in FIG. 3 is configured to decode MPEG data. The MPEG decoder (360) illustrated in FIG. 3 may be any program, circuit, or algorithm which decodes data from an MPEG format and converts it to an uncompressed digital video format.

The memory storage apparatus (370) illustrated in FIG. 3 may include, but is in no way limited to, read only memory (ROM) and/or random access memory (RAM). The memory storage apparatus (370) illustrated in FIG. 3 is configured to store both software applications as well as data signal information.

According to one exemplary embodiment, data signals traveling downstream from the cable headend (110) to the set-top box (130) are transmitted using the DigiCipher II (DCII) system. DCII is a proprietary digital encoding and encryption format based upon the Moving Pictures Experts Group (MPEG) 2 standard that was designed for coding interlaced images at transmission rates of approximately 4 million bits per second.

Traditionally, set-top boxes (130) having the added ability to send messages upstream to the cable headend (110) have done so using an Aloha return channel. Aloha, refers to a simple communications scheme in which each source, a transmitter such as a set-top box (110), in a network sends data whenever there is a frame to send. If the frame successfully reaches the destination (the cable headend (110)), the next frame is sent. If, however, the frame fails to be received at the destination, it is sent again. While Aloha works well in small systems, in more complex systems involving multiple sources and destinations that share a common data path, difficulties occurs because data frames collide (conflict) resulting in a degradation of system efficiency.

According to one exemplary embodiment of the present system and method, the Aloha return channel is replaced with a Data Over Cable Service Interface Specifications (DOCSIS) return channel. DOCSIS is a standard interface for cable modems that specifies modulation schemes and the protocol for exchanging bidirectional signals over cable. It supports downstream-to-the-user data rates up to 38 Mbps (megabits per second).

In order to implement control of a DOCSIS time division multiple access (TDMA) return channel, a downstream DOCSIS data channel is also provided. While one way to replace the Aloha channel with a DOCSIS channel is to add a cable modem to the set-top box (130), this adds significant cost to the cost of the set-top box (130) as well as the overall system (100). In order to eliminate the cost associated with adding a cable modem to a set-top box (130), the present system and method are configured to multiplex the DOCSIS and DCII data into a single MPEG Transport Stream. Because both the DCII data and DOCSIS data are formatted as MPEG Transport Stream (TS) packets, they may be multiplexed together. However, the multiplexing operation is complicated by the fact that each system generates time-critical synchronization data (time stamps), and the validity of the data will only be preserved by including the proper time stamps.

Synchronization data is included in the DCII packet stream in a number of MPEG program clock reference (PCR) fields. Similarly, synchronization data is included in a DOCSIS packet stream in a number of DOCSIS SYNC messages. Rather than locating both the MPEG PCR fields in the DCII packet stream and the DOCSIS SYNC messages in the DOCSIS packet stream and adjusting the time stamps contained in one or both of these fields prior to transmission in a multiplexed stream, one embodiment of the present system and method synchronizes the DOCSIS clock to the MPEG clock in the headend (110) and transmits only the PCR fields in the multiplexed MPEG TS. The MPEG clock is then recovered using the received PCR fields by the set-top box (130) and used to generate a DOCSIS reference clock from the recovered MPEG clock. According to this exemplary embodiment, the DOCSIS data, which is not very time-critical when compared to the DCII data, may be multiplexed into the MPEG TS. According to one exemplary embodiment, the DOCSIS data is multiplexed as "opportunistic data," overwriting null packets in the DCII TS. In yet another exemplary embodiment, null packets in the DCII or other MPEG based TS may be deleted and DOCSIS packets inserted at different locations in the TS, thereby moving some of the MPEG packets from their original positions relative to each other. Any number of multiplexing methods may be used as long as the accuracy of the PCR values is preserved. Further explanation of the multiplexing of both DOCSIS and DCII data into a single MPEG TS will be provided in detail below with reference to FIGS. 5 and 6.

Figure 4:
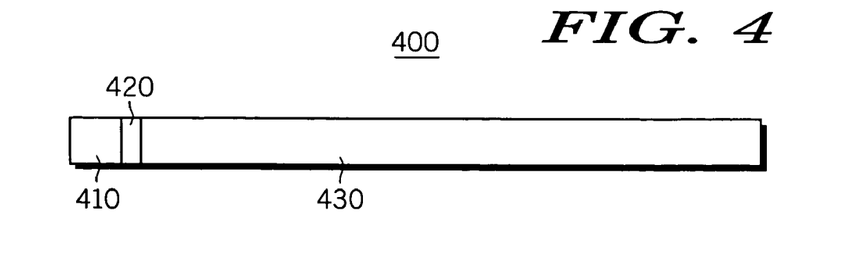
FIG. 4 is a block diagram illustrating the structure of an MPEG 2 data packet according to one exemplary embodiment.

FIG. 4 illustrates the structure of an MPEG data packet according to one exemplary embodiment. As shown in FIG. 4, an MPEG-2 frame (400) of 188 bytes includes a number of fields including a header (410), an optional one-byte pointer (420), and a data payload (430). The header (410) starting the 188 byte frame (400) includes a specific packet identifier (PID) (not shown) into the header (410) that identifies the MPEG-2 data as part of either a DOCSIS data stream, a DCII data stream, or another non-DOCSIS type data stream. While the present system and method is described in the context of multiplexing a DCII data stream and a DOCSIS data stream, it will be understood that the present system and method may be used to multiplex a DOCSIS data stream into any MPEG data stream.

Following the header (410) is an optional one-byte pointer (420). One use for the pointer is referencing Media Access Control (MAC) frames. Unused pointer locations (420) are filled with data. The data payload (430) illustrated in FIG. 4 is 183 bytes long (184 without the pointer (420)). If the data does not need the entire payload capacity, stuff bytes fill the reminder payload locations. Multiplexing of DOCSIS data into an MPEG Transport Stream will now be described in further detail below with reference to FIG. 5.

Signal Manipulation

When multiplexing DOCSIS data onto an MPEG Transport Stream for transmission from the cable headend unit (110; FIG. 1) to a set-top box (130; FIG. 1), the process entails more than just frequency synchronization. According to one exemplary embodiment, as the head end unit (110; FIG. 1) produces or receives both DOCSIS data and DCII data, the DOCSIS data is multiplexed into the DCII signal by inserting DOCSIS data into empty data packets (null packets) of the DCII or other similar MPEG data stream. In order to process the multiplexed signal when received in the set-top box (130; FIG. 1), both the actual clock values of the DOCSIS clock and the MPEG clock are needed. However, in order to eliminate the need to add a cable modem, only the value of the MPEG PCR is transmitted with the multiplexed signal. Consequently, the two clocks must be synchronized in a way that allows the receiving set-top box to calculate the DOCSIS clock value from the MPEG clock which can be recovered using the received PCR fields.

The DOCSIS clock value is calculated, according to one exemplary embodiment, by a scaling of the MPEG clock value. More specifically, the DOCSIS system clock operates at 10.24 MHz and the MPEG system clock operates at 27 MHz. Consequently, the DOCSIS clock can be generated by a 256/675 scaling of the MPEG clock. Similarly, it is also possible to us the MPEG 90 kHz "base" clock to generate the DOCSIS clock. According to this alternative embodiment, the MPEG 90 kHz "base" clock is scaled by 1024/9 to generate the DOCSIS 10.24 MHz clock.

The DOCSIS clock value generated by the set-top box is based on the full PCR value in order to obtain the fine granularity of the 27 MHz clock. The "base" MPEG clock has a period of over 100 periods of the DOCSIS clock, so using the base PCR value could yield highly jittered DOCSIS clock timestamps. However, using the full PCR value is complicated by the fact that the "extension" PCR counter rolls over at 300.

To avoid counter rollover ambiguity, the epoch of the MPEG clock counter (time between rollovers of the MPEG clock counter) must be an integer multiple of the epoch of the DOCSIS clock counter. This is easy to do since the DOCSIS epoch is an integer number of counts of the PCR base clock, as shown in table 1 below.

TABLE 1

| | |
|---|---|
| Epoch of the DOCSIS counter | $= 2^{32}/10.24e6$ seconds |
| Corresponding MPEG clock base periods | $= 90e3 * 2^{32}/10.24e6$ |
| | $= 9e4 * 2^{32}/(2^{10} * 1e4)$ |
| | $= 9 * 2^{22}$ |
| | $= 37,748,736$ |

As shown above, the DOCSIS epoch (approximately 6.99 minutes) is an integer number of counts of the MPEG base clock (90 kHz). The full MPEG clock epoch ($2^{33}/9e4$ seconds) is about 26.5 hours. This can be shortened to any convenient integer multiple of the DOCSIS epoch. Consequently, rollover ambiguity will be avoided. The "early" rollover of the MPEG clock can be indicated with the MPEG discontinuity$_{13}$indicator in the MPEG TS Adaptation Field.

Consequently, the DOCSIS clock timestamp can be generated from an associated MPEG PCR timestamp as illustrated below in Equation 1, where Rem[ ] is the remainder operation.

$$DOCSIS \text{ timestamp} =$$
$$10.24e6 * Rem[\text{MPEG\_PCR\_time}, DOCSIS \text{ epoch}] =$$
$$10.24e6 * Rem[(\text{MPEG\_PCR\_value}/27e6), (2^{32}/10.24e6)] =$$
$$Rem[(10.24 * \text{MPEG\_PCR\_value}/27), 2^{32}] \quad \text{Eq. 1}$$

Figure 7:
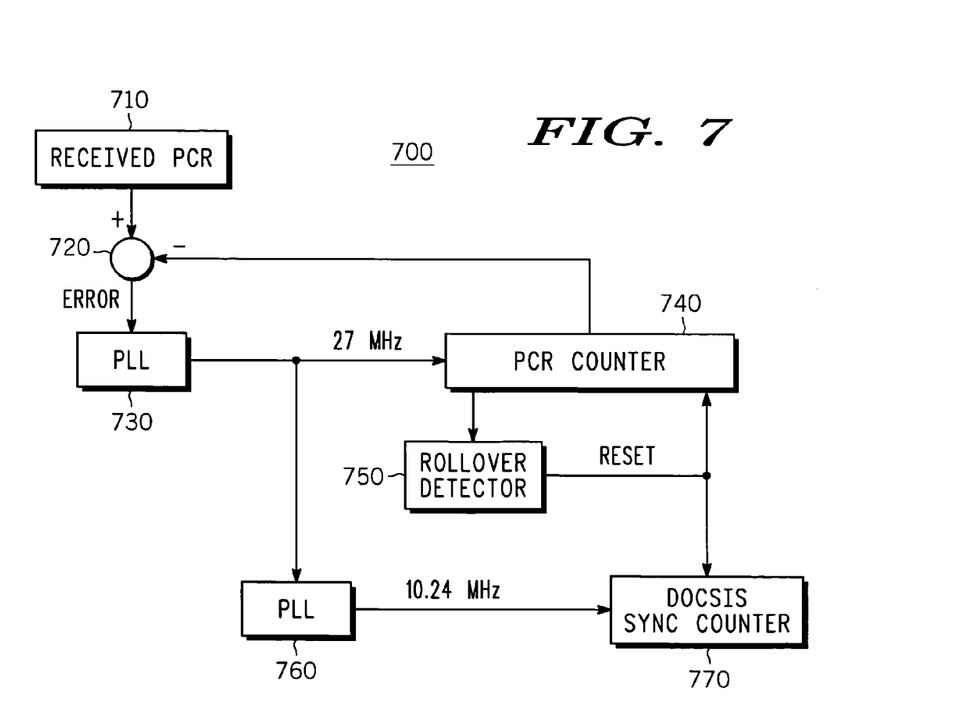
FIG. 7 is a simplified block diagram illustrating a clock recovery circuit according to one exemplary embodiment.

Further explanation of how the DOCSIS clock timestamp is generated from the MEG PCR timestamp as illustrated in Equation 1 will be given below with reference to FIG. 7.

Exemplary Implementation and Operation

Figure 5:
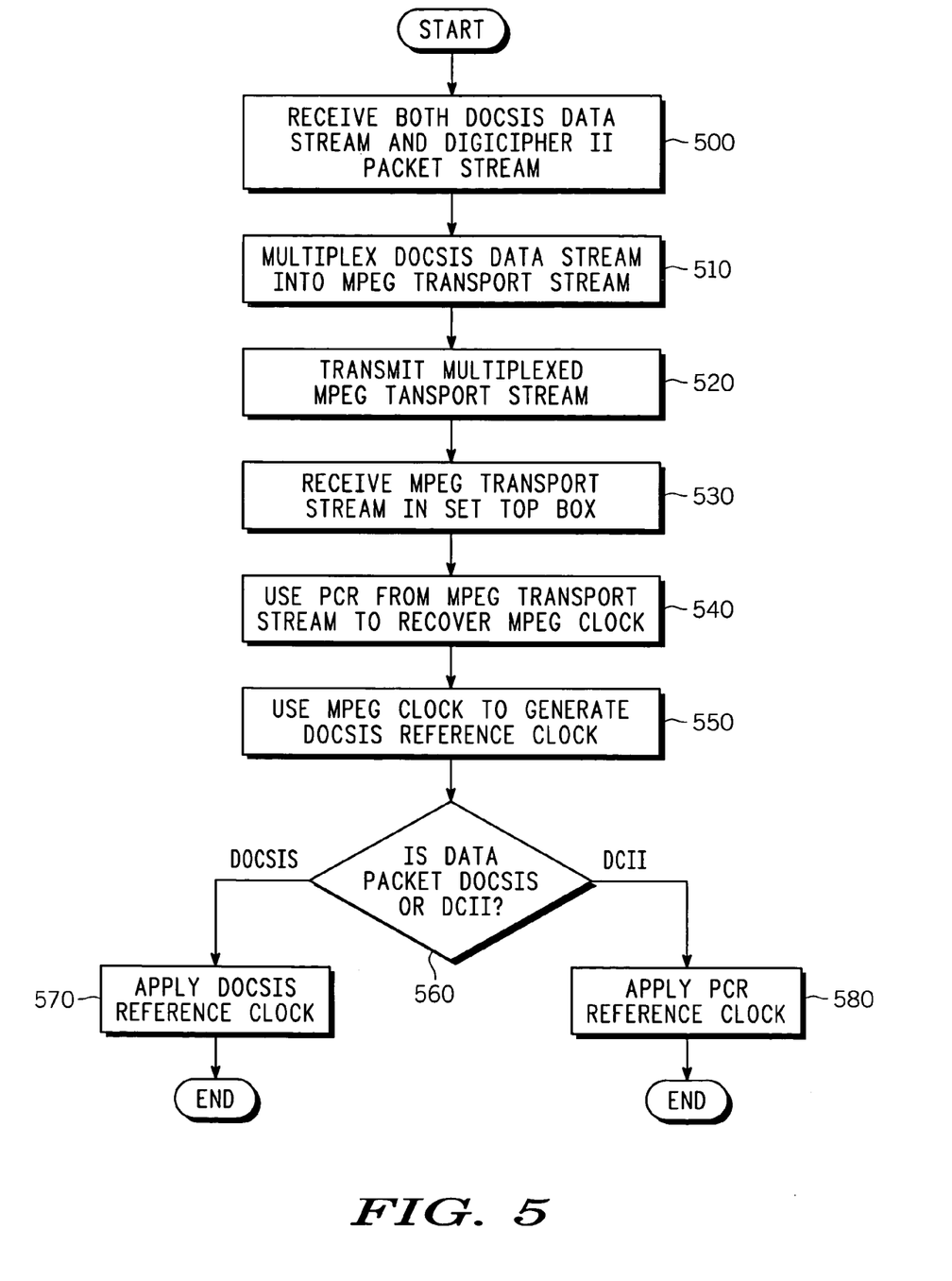
FIG. 5 is a flow chart illustrating a method for multiplexing DOCSIS data into an MPEG Transport Stream according to one exemplary embodiment.

FIG. 5 is a flow chart illustrating a method for multiplexing DOCSIS data into an MPEG Transportation Stream using the above-mentioned DOCSIS SYNC time stamp generation. As shown in FIG. 5, the present method for multiplexing DOCSIS data into an MPEG transport stream begins by receiving or generating both a DOCSIS data stream and a DCII packet stream (500). Once received in the cable headend, the DOCSIS data stream is multiplexed into the MPEG Transport Stream as "opportunistic data" overwriting null packets in the DCII Transport Stream (510). Once multiplexed, the MPEG Transport Stream is transmitted from the cable headend unit (520), over the cable network, to the set-top box (530). As the MPEG Transport Stream is transmitted, only the PCR in the multiplexed MPEG Transport Stream is transmitted with the data. Once received by the set-top box, the PCR in the multiplexed MPEG Transport Stream is recovered (540) and used to formulate a DOCSIS reference clock (550). Knowing both the MPEG PCR and the DOCSIS reference clock, the set-top box may then identify each data packet as either a DOCSIS data packet or a DCII data packet (560) and apply the appropriate reference clock (570, 580), thereby correctly processing each signal. The above-mentioned steps will now be explained in further detail below.

As shown in FIG. 5, one exemplary embodiment of the present system and method begins when both a DOCSIS data stream and a DCII packet stream are received or produced by a headend unit or a set-top box. The data contained in the DCII packet stream may be, but is in no way limited to, a television signal, a satellite signal, etc. Similarly, the DOCSIS data stream may include, but is in no way limited to, digital television data, HTML files, or upstream configuration parameters including MAC messages needed to accomplish ranging and registration, the cable modem configuration file, and any data needed by the various applications in the set-top box. The MAP messages allocating the upstream channel to various transmitters may also be included in the DOCSIS data stream. Typically, the data contained in the DOCSIS data stream is not very time-sensitive.

Figure 6:
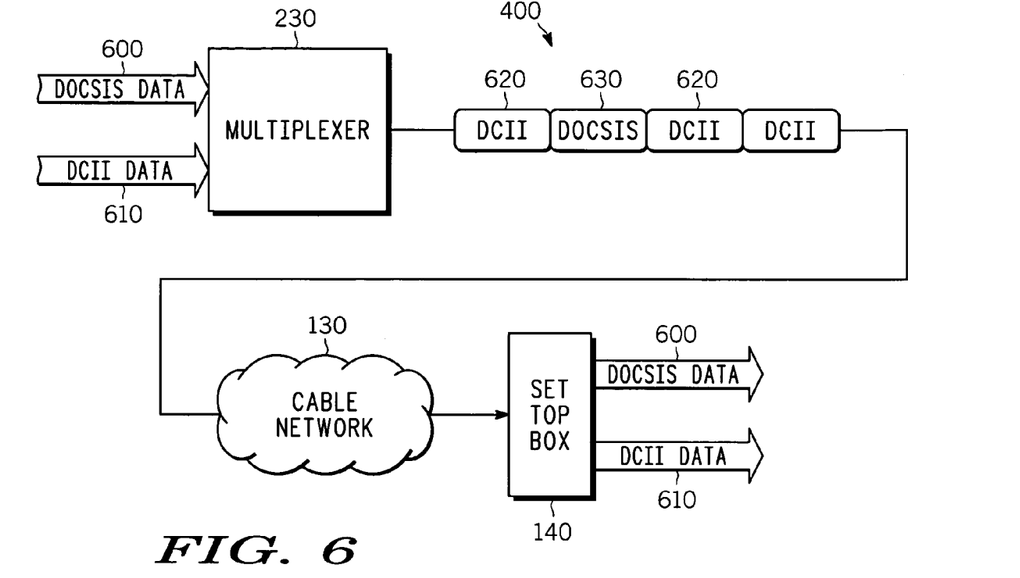
FIG. 6 is a simple block diagram illustrating a data flow that multiplexes DOCSIS data into an MPEG Transport Stream according to one exemplary embodiment.

Once received, the DOCSIS data stream is multiplexed into the MPEG Transport Stream (510). FIG. 6 further illustrates the multiplexing of the DOCSIS data stream into the MPEG Transport Stream. As shown in FIG. 6, the multiplexer (230) located at the cable headend receives both a DOCSIS data stream (600) and a DCII or other MPEG based data stream (610) from sources with their respective system clocks synchronized. According to one exemplary embodiment, the DOCSIS data stream (600) is then multiplexed into the MPEG Transport Stream (400) as "opportunistic data" overwriting null packets (630) in the DCII Transport Stream. The null packets (630) over which the DOCSIS data is overwritten are intermingled with DCII data packets (620) as shown in FIG. 6. The DOCSIS data stream and the DCII data stream may easily be multiplexed due to the fact that they are both based on MPEG 2. While overwriting null packets with the DOCSIS data is illustrated as one exemplary method for multiplexing the two signals, in another exemplary embodiment, the MPEG packets are moved in the packet stream to allow the DOCSIS data packets to be carried where they were. Regardless of the multiplexing method incorporated, the validity of the data may be preserved by synchronizing the two clocks and sending a single MPEG TS. As the DOCSIS data stream is multiplexed into the DCII data stream, the SYNC packet is not sent. Rather, the present system is configured to lock the DOCSIS time stamp with the MPEG PCR. This enables the receiver to generate a DOCSIS clock from the MPEG PCR values. In an alternative embodiment, the SYNC packet is transmitted with the MPEG TS and merely ignored when received by the receiver. This alternative method eliminates the need for the multiplexer to identify the SYNC packet.

Once synchronized and multiplexed, the MPEG Transport Stream is transmitted from the cable headend unit, over the cable network (130), to the set-top box (520; FIG. 5). As the MPEG Transport Stream is transmitted, only the PCR in the multiplexed MPEG Transport Stream (400) is transmitted.

Once received by the set-top box (140), the PCR in the multiplexed MPEG Transport Stream (400) is used to recover the MPEG clock (550; FIG. 5) according to traditional methods. However, once recovered, the MPEG clock is used to formulate a DOCSIS reference clock (550; FIG. 5). FIG. 7 is a simplified block diagram illustrating a clock recovery circuit (700) configured to perform the generation of the DOCSIS timestamp value illustrated in Equation 1 according to one exemplary embodiment. As shown in FIG. 7, the recovered PCR (710) is fed to a subtractor (720) which subtracts it from the value of the PCR counter (740) located in the set-top box (140; FIG. 1). Once fed both signals, the subtractor (720) produces an error value. This error value is then sent to a phase-lock loop (730) having an oscillator nominally matching the frequency of the DCII clock signal of 27 MHz. The 27 MHz signal is sent to the PCR counter (740) in the set-top box (140; FIG. 1). The 27 MHz signal is also transmitted to a second phase-lock loop (760) having an oscillator nominally matching the DOCSIS frequency of 10.24 MHz. Once both phase-lock loops are locked, the 10.24 MHz signal is equivalent to the DOCSIS clock. The 10.24 MHz signal is sent to the DOCSIS SYNC counter (770) in the set-top box (140; FIG. 1). Thus, the clock recovery circuit illustrated in FIG. 7 generates a DOCSIS SYNC value based on the recovered PCR according to the following equation where Rem[ ] is the remainder operation:

$$SYNC \text{ timestamp} =$$
$$10.24e6 * Rem[\text{MPEG\_PCR\_time}, DOCSIS \text{ epoch}] =$$
$$10.24e6 * Rem[(\text{MPEG\_PCR\_value}/27e6), (2^{32}/10.24e6)] =$$
$$Rem[(10.24 * \text{MPEG\_PCR\_value}/27), 2^{32}] \quad \text{Eq. 1}$$

The first PCR received by the clock recovery circuit (700) is used to initialize the PCR counter (740). The clock recovery circuit (700) uses the first PCR value received and Equation 1 above to calculate an equivalent DOCSIS SYNC timestamp. The DOCSIS SYNC timestamp is then used to initialize the DOCSIS SYNC counter (770).

Additionally, a rollover detector (750) is coupled to the PCR counter (740) and the DOCSIS SYNC counter (770). The rollover detector (750) is set at a predetermined value, which is a multiple of the DOCSIS epoch. When the PCR counter (740) reaches the predetermined value during operation, both the PCR counter (740) and the DOCSIS SYNC counter (770) are reset to avoid rollover incongruence.

After both the MPEG PCR and the DOCSIS reference clock values are known, the set-top box identifies each received data packet in the received MPEG stream as either a DOCSIS data packet or a non-DOCSIS data packet such as a DCII data packet (560) based on its PID value. Identification of the data packets received by the set-top box (140; FIG. 1) is performed by accessing the PID values in the header of each packet. One PID value will indicate that the data packet is a DOCSIS data packet and other PID values will indicate that the data packet is a DCII data packet or another non-DOCSIS data packet. Using the recovered PCR value and the generated DOCSIS SYNC value, the appropriate reference clock value (570, 580) can then be applied to the identified data packets thereby correctly processing each signal.

Alternative Embodiments

According to one exemplary embodiment, rather than transmitting PCR values with the MPEG Transport Stream, the DOCSIS SYNC time stamp values are transmitted with the MPEG TS. Similar to the exemplary embodiment illustrated above, the present exemplary embodiment synchronizes the MPEG system clock and the DOCSIS system clocks. After synchronization, the DOCSIS data stream is multiplexed into null packets of the MPEG TS while preserving the accuracy of the SYNC timestamp values. Once multiplexed, the Transport Stream, including a number of DOCSIS SYNC time stamp values, is transmitted to a receiving device. Once received, the DOCSIS SYNC time stamp values are recovered to generate a DOCSIS clock. The DOCSIS clock is then scaled to generate an MPEG clock using similar methods to those illustrated above. According to one exemplary embodiment, only the DOCSIS SYNC time stamp values are transmitted with the Transport Stream. However, the MPEG PCR values may also be transmitted and subsequently ignored by the receiving device according to one exemplary embodiment.

According to yet another alternative embodiment, both the DOCSIS system clock and the MPEG system clock may be synchronized to a third clock having an independent operating frequency (e.g. 4 MHz). According to this exemplary embodiment, time stamps based on this third clock are also multiplexed into the TS and sent with the TS to a receiving device. Once the third clock is recovered in the receiving device from the timestamps, the third clock may be scaled by two PLLs to generate the MPEG and DOCSIS clocks. Once generated, the MPEG and DOCSIS clocks may be selectively applied to the received data packets based upon their PID values as illustrated above.

In conclusion, the present method and system for multiplexing DOCSIS data into an MPEG Transport Stream simplifies the multiplexing operation while simultaneously reducing the necessary complexity of the set-top box. More specifically, the present system and method multiplexes a DOCSIS data stream into a DCII or other MPEG-based data stream at the headend. When multiplexing the data streams, the system locks the DOCSIS clock with the MPEG clock and only the MPEG PCR values are sent to the receiving set-top box, requiring only one tuner and demodulator. Once received, the PCR values are recovered and used to generate a DOCSIS reference clock which may then be selectively applied to previously identified DOCSIS data packets.

The preceding description has been presented only to illustrate and describe the present method and system. It is not intended to be exhaustive or to limit the present method and system to any precise form disclosed. Many modifications and variations are possible in light of the above teaching.

The foregoing embodiments were chosen and described in order to illustrate principles of the method and system as well as some practical applications. The preceding description enables others skilled in the art to utilize the method and system in various embodiments and with various modifications as are suited to the particular use contemplated. It is intended that the scope of the method and system be defined by the following claims.

What is claimed is:

1. A method for multiplexing Data Over Cable Service Interface Specifications (DOCSIS) data into an Moving Pictures Experts Group (MPEG) Transport Stream comprising:
   synchronizing an MPEG system clock and a DOCSIS system clock;
   multiplexing a DOCSIS data stream into an MPEG Transport Stream while preserving the accuracy of a number of MPEG program clock reference (PCR) values;
   transmitting said multiplexed Transport Stream including said PCR values;
   receiving said multiplexed Transport Stream in a receiving device;
   recovering said MPEG PCR values; and
   generating a DOCSIS clock based on said MPEG PCR values.

2. The method of claim 1, wherein said multiplexing a DOCSIS data stream into an MPEG Transport Stream comprises overwriting a number of null packets of said MPEG Transport Stream with a number of packets containing DOCSIS data.

3. The method of claim 1, wherein said generating said DOCSIS clock based on said MPEG PCR values comprises:
   receiving said MPEG PCR values in said receiving device;
   recovering said MPEG system clock; and
   scaling said MPEG system clock using a phase-locked loop to generate said DOCSIS system clock.

4. The method of claim 3, wherein said step of recovering said MPEG system clock comprises locking a local 27 MHz clock based on said received MPEG PCR values.

5. The method of claim 1, further comprising:
   identifying a number of packets of said MPEG Transport Stream; and
   applying either said MPEG clock value or said generated DOCSIS clock value to said number of packets based on said identification.

6. The method of claim 5, wherein said packets are identified by a packet identifier located in said packet.

7. The method of claim 6, wherein said packets are identified as either a DOCSIS packet or a non-DOCSIS packet.

8. A system for multiplexing Data Over Cable Service Interface Specifications (DOCSIS) data into an Moving Pictures Experts Group (MPEG) Transport Stream comprising:
   a signal transmitter including a multiplexer; and
   a signal receiver communicatively coupled to said signal transmitter;
   wherein said signal transmitter is configured to synchronize an MPEG system clock and a DOCSIS clock, multiplex said DOCSIS data into said MPEG Transport Stream, and transmit said MPEG Transport Stream to said signal receiver including a number of MPEG program clock reference (PCR) values corresponding to said DOCSIS data;

wherein said receiver is configured to generate a DOCSIS clock value for said DOCSIS data based upon said MPEG PCR values.

9. The system of claim 8, wherein said multiplexed Transport Stream is configured to be received by one tuner and one demodulator.

10. The system of claim 8, wherein said signal receiver is configured to:
receive said MPEG PCR values;
recover said MPEG system clock from said MPEG PCR values; and
scale said MPEG system clock to generate a DOCSIS system clock.

11. The system of claim 10, wherein said MPEG system clock is recovered by locking a local clock disposed in said signal receiver based on said received MPEG PCR values.

12. The system of claim 8, wherein said signal receiver forms a part of a set-top box.

13. The system of claim 8, wherein said signal transmitter forms a part of a headend unit.

14. A system for multiplexing Data Over Cable Service Interface Specifications (DOCSIS) data into an Moving Pictures Experts Group (MPEG) Transport Stream comprising:
means for transmitting a signal;
means for multiplexing communicatively coupled to said means for transmitting; and
means for receiving a signal communicatively coupled to said means for transmitting;
wherein said means for transmitting is configured to synchronize an MPEG system clock and a DOCSIS system clock, multiplex said DOCSIS data into said MPEG Transport Stream, and transmit said MPEG Transport Stream to said means for receiving a signal including a number of MPEG program clock reference (PCR) values corresponding to said DOCSIS data;
wherein said means for receiving a signal is configured to generate a DOCSIS clock value for said DOCSIS data based upon said MPEG PCR values.

15. The system of claim 14, wherein multiplexed Transport Stream is configured to be received by one tuner and one demodulator.

16. The system of claim 14, wherein said means for receiving a signal is configured to:
receive said MPEG PCR values;
recover said MPEG system clock; and
scale said MPEG system clock using a phase-locked loop to generate said DOCSIS system clock.

17. A data transmitter configured to multiplex Data Over Cable Service Interface Specifications (DOCSIS) data into a Moving Pictures Experts Group (MPEG) Transport Stream comprising:
a transmitter; and
a multiplexer communicatively coupled to said transmitter;
wherein said multiplexer is configured to synchronize an MPEG system clock and a DOCSIS system clock and multiplex said DOCSIS data into said MPEG Transport Stream such that a DOCSIS clock associated with said DOCSIS data may be generated from a number of MPEG program clock reference (PCR) values.

18. The data transmitter of claim 17, wherein said multiplexer is configured to multiplex said DOCSIS data into said MPEG Transport Stream by overwriting a number of null packets of said MPEG Transport Stream with a number of packets containing said DOCSIS data.

19. The data transmitter of claim 17, wherein said transmitter is further configured to transmit said multiplexed MPEG Transport Stream including said MPEG PCR values to a receiving device.

20. A data receiver comprising:
a tuner; a
a demodulator; and
a processor;
wherein said data receiver is configured to receive a multiplexed Moving Pictures Experts Group (MPEG) Transport Stream including Data Over Cable Service Interface Specifications (DOCSIS) data and a plurality of MPEG program clock reference (PCR) values;
wherein said receiver is configured to generate a DOCSIS clock value for said DOCSIS data based upon said MPEG PCR values.

21. The data receiver of claim 20, wherein said receiver is configured to:
receive said MPEG PCR values;
lock a local clock disposed in said receiver based on said received MPEG PCR values;
compute a difference between said received PCR values and said local clock; and
adjust the frequency of said local clock based on said computed difference.

22. A method for multiplexing Data Over Cable Service Interface Specifications (DOCSIS) data into an Moving Pictures Experts Group (MPEG) Transport Stream comprising:
synchronizing an MPEG system clock and a DOCSIS system clock;
multiplexing a DOCSIS data stream into an MPEG Transport Stream while preserving the accuracy of a number of DOCSIS SYNC timestamp values;
transmitting said multiplexed Transport Stream including said DOCSIS SYNC timestamp values;
receiving said multiplexed Transport Stream in a receiving device;
recovering said DOCSIS SYNC timestamp values; and
generating an MPEG system clock based on said DOCSIS SYNC timestamp values.

23. The method of claim 22, wherein said generating said MPEG system clock based on said DOCSIS SYNC timestamp values comprises:
receiving said DOCSIS SYNC timestamp values in said receiving device;
recovering said DOCSIS system clock; and
scaling said DOCSIS system clock using a phase-locked loop to generate said MPEG system clock.

24. The method of claim 23, wherein said step of recovering said DOCSIS system clock comprises locking a local 10.24 MHz clock based on said received DOCSIS SYNC timestamp values.

25. The method of claim 22, further comprising:
identifying a number of packets of said MPEG Transport Stream; and
applying either said MPEG clock value or said generated DOCSIS clock value to said number of packets based on said identification.

26. A method for multiplexing Data Over Cable Service Interface Specifications (DOCSIS) data into an Moving Pictures Experts Group (MPEG) Transport Stream comprising:
synchronizing an MPEG system clock and a DOCSIS system clock to a third clock;
multiplexing a DOCSIS data stream into an MPEG Transport Stream;

transmitting said multiplexed Transport Stream including a number of time stamp values from said third clock;

receiving said multiplexed Transport Stream in a receiving device;

recovering said time stamp values from said third clock; and generating both an MPEG system clock and a DOCSIS system clock based on said time stamp values from said third clock.

27. The method of claim 26, wherein said generating said MPEG system clock and said DOCSIS system clock based on said time stamp values from said third clock comprises:

receiving said time stamp values from said third clock in said receiving device;

recovering said third clock;

scaling said third clock using a first phase-locked loop to generate said MPEG system clock; and scaling said third clock using a second phase-locked loop to generate said DOCSIS system clock.

28. The method of claim 27, wherein said step of recovering said third clock comprises locking a local clock having the same operating frequency as said third clock, wherein said locking is based on said received time stamp values.

29. The method of claim 26, further comprising:

identifying a number of packets of said MPEG Transport Stream; and applying either said MPEG clock value or said generated DOCSIS clock value to said number of packets based on said identification.

* * * * *